(12) United States Patent
Fedan

(10) Patent No.: US 10,084,625 B2
(45) Date of Patent: Sep. 25, 2018

(54) MINIATURE WIRELESS COMMUNICATION SYSTEM

(71) Applicant: Orest Fedan, Hyde Park, MA (US)

(72) Inventor: Orest Fedan, Hyde Park, MA (US)

( * ) Notice: Subject to any disclaimer, the term of this patent is extended or adjusted under 35 U.S.C. 154(b) by 6 days.

(21) Appl. No.: 15/436,777

(22) Filed: Feb. 18, 2017

(65) Prior Publication Data

US 2018/0241595 A1    Aug. 23, 2018

(51) Int. Cl.
*H04B 1/10*      (2006.01)
*H04L 27/06*    (2006.01)
*H04W 52/52*  (2009.01)

(52) U.S. Cl.
CPC .......... *H04L 27/063* (2013.01); *H04W 52/52* (2013.01)

(58) Field of Classification Search
CPC .................................................. H04W 52/52
USPC ......................................................... 375/350
See application file for complete search history.

(56) References Cited

U.S. PATENT DOCUMENTS

| | | | |
|---|---|---|---|
| 3,185,981 A * | 5/1965 | Bath | A47J 31/053 342/100 |
| 4,101,873 A * | 7/1978 | Anderson | G02C 11/00 128/201.19 |
| 5,479,522 A * | 12/1995 | Lindemann | H04R 25/356 381/23.1 |
| 5,721,783 A | 2/1998 | Anderson | |
| 5,734,976 A | 3/1998 | Bartschi | |
| 5,751,820 A | 5/1998 | Taenzer | |
| 5,774,791 A * | 6/1998 | Strohallen | H04B 5/0006 455/41.1 |
| 5,905,473 A | 5/1999 | Taenzer | |
| 6,115,478 A | 9/2000 | Schneider | |
| 6,594,370 B1 | 7/2003 | Anderson | |
| 7,372,970 B2 | 5/2008 | Ach-Kowalewski | |
| 7,388,446 B2 | 6/2008 | Souetinov | |
| 7,570,974 B2 | 8/2009 | Kaltenbach | |
| 7,778,433 B2 | 8/2010 | Lee | |
| 8,041,066 B2 | 10/2011 | Solum | |
| 8,248,316 B2 | 8/2012 | Christensen | |
| 8,358,991 B2 * | 1/2013 | Chen | H04B 1/28 330/261 |
| 8,494,197 B2 | 7/2013 | Polinske | |
| 8,498,434 B2 | 7/2013 | Andersen | |
| 8,565,457 B2 | 10/2013 | Polinske | |
| 8,811,639 B2 | 8/2014 | Solum | |
| 9,191,757 B2 | 11/2015 | Bauman | |
| 9,247,355 B2 | 1/2016 | El-Hoiydi | |

(Continued)

*Primary Examiner* — Helene Tayong

(57) ABSTRACT

A wireless microphone with the remote transmitter using a duplicate of the radio frequency determining circuits of the radio receiver to insure that the remote transmitter frequency tracks the temperature drift of the radio receiver frequency, and also with a compressor to reduce the dynamic range of the sounds captured by the microphone. The superheterodyne radio receiver having small size and low current consumption by wiring the elements of the receiver in series rather than in parallel with the battery avoiding the use of switching regulators and also by using the same amplifier to amplify the antenna signal and the local oscillator signal and by adjusting the local oscillator current based on the strength of the received radio signal. The wires between the radio receiver and the speaker are part of the antenna for the radio receiver.

14 Claims, 3 Drawing Sheets

(56) References Cited

U.S. PATENT DOCUMENTS 9,344,816 B2* 5/2016 Larsen .................... H01Q 1/00
2003/0198306 A1* 10/2003 Forrester ................ H04B 1/109
                                                                                 375/345

* cited by examiner

MINIATURE WIRELESS COMMUNICATION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND

Field of Invention

This invention pertains in general to miniature, high frequency wireless communication systems, and, more particularly, to two-piece systems for improving hearing.

Description of Prior Art

Examples of hearing instruments include hearing aids. A hearing aid is generally a one-piece unit that integrates both a microphone and a speaker into one assembly. Due to the proximity of the microphone and speaker there is a strong tendency for feedback induced oscillations to occur. These oscillations quickly grow to full intensity which are often at hearing damaging levels. To prevent such oscillations, the assembly needs to have an air tight seal between the microphone and the speaker. When the assembly is inserted into the human ear canal this air tight seal is formed part way into the ear canal such that it blocks the ear canal with the speaker on the inside of the block and the microphone on the outside of the block. With user head motion, the block tends to unseat, thus reducing its ability to block the ear canal and oscillations ensue. One solution to this problem has been to introduce a subsonic tone into the signal sent to the speaker. If the tone is picked up by the microphone, the amplifying circuitry reduces its gain. This does prevent the feedback oscillations but it also renders the hearing aid useless, as the user depends on the gain being high in order to hear. Blocking the human ear canal is also a source of distortion. The ear canal has a frequency response characterized by sharp resonances and nulls with the result that the signal generated by the hearing device which is intended to be presented to the ear drum is, in fact, distorted by these resonances and nulls as it passes through the ear canal. These resonances and nulls change as a function of the degree to which the hearing aid closes the ear canal to air outside the canal and how far the hearing aid is inserted into the ear canal. Correction of the frequency response distortion is attempted by adjusting the physical design of the hearing aid and by adjusting the frequency response of the electronic amplifier circuit between the microphone and the speaker, but with limited results. Often, the user of the hearing aid has no trouble hearing low frequencies and blocking the ear canal deprives the user from enjoying natural hearing abilities in that part of the spectrum. All the above problems can be solved with a two-piece wireless unit with the microphone in one piece and the speaker in the other and with enough separation between the two pieces such that the ear canal does not need to be blocked and also with the speaker not inserted too deeply into the ear canal. Due to the limited space and battery power available in a hearing aid, a power efficient radio receiver system for the wireless communication is needed.

Another limitation of hearing aids stems from that fact that persons with hearing impairments often have a reduced dynamic range of sounds which they are capable of hearing. The reduction is not only at the low end, where weak sounds are too quiet to be heard. It is also at the high end, where loud sounds are distorted, and therefore can not be understood. To match the intensity range of sounds which are desirable to be heard to the (smaller) intensity range which the hearing impaired person is capable of hearing, a signal compression system is needed.

Some newer hearing aid types in addition to using internal microphones also comprise internal wireless receivers but still block the ear canal so that the non-wireless internal microphone can make up for poor performance of the wireless receiver. Other new hearing instruments incorporate wireless receivers with good performance but with high current consumption. Most of these wireless receiver types draw their power directly from the hearing aid battery. Prolonged use of wireless receivers known in the art may lead to rapid depletion of the hearing aid battery necessitating frequent battery changes or frequent battery recharging.

Prior art wireless receivers in hearing instruments have used analog, Bluetooth digital or proprietary digital radio modulations at LF (low frequency: 0.03-0.30 MHz), VHF (very high frequency: 30-300 MHz), UHF (ultra high frequency: 300-3000 MHz) and SHF (super high frequency: 3000-30,000 MHz) carrier frequencies. Bluetooth digital modulations are not very useful for wireless hearing assistance receivers because such modulations require receiver circuits that draw too much current from the battery resulting in either a large battery or frequent recharging. The receiver and battery are worn around the ear of the user, so these can not be large. Even Bluetooth Low Energy (BLE) receivers require 12 mA of current. A battery small enough to mount around the ear can only provide around 100 mA-hr of energy. This is enough to power a BLE receiver for only 8 hours before needing to be recharged. This does not even include the current required for driving the speaker. Some makers of hearing assistance devices have included Bluetooth radio links in their products, but only as accessories which can be used for short time periods every once in a while.

In one example of prior art, U.S. Pat. No. 5,734,976 issued Mar. 31, 1998 describes a traditional radio topology with analog modulation at a VHF carrier frequency between 30 and 200 MHz but has poor performance because the antenna efficiency is poor at these frequencies. For good efficiency, an antenna needs to be approximately one half wavelength ($\lambda/2$) long or longer. At 200 MHz, $\lambda/2$ is 2.4 feet. A receiving antenna positioned around the ear of a user can not conveniently be this long. So a shorter antenna is used and the bandwidth of the signal is reduced to increase the receiver's sensitivity to make up for some of the loss in antenna efficiency. In the end, the signal suffers from both impairments: still too poor receiver sensitivity and poor audio frequency response due to reduced bandwidth (the audio signal bandwidth is preferably more than 6 KHz so that all essential speech information is preserved). A microphone is installed alongside the receiver and some of the amplified signal from the microphone is added to the signal from the radio receiver (depending on the strength of the radio signal). This, of course, requires blocking the ear canal.

As the carrier frequency is increased, receiver current consumption increases. At UHF frequencies antenna efficiency is good using antennas small enough to fit around the ear. However, the current consumption of a traditional topology radio receiver at UHF frequencies is prohibitive for a device installed around the ear of a user because it results in either an inconveniently large battery or too small a battery life (requiring frequent recharging).

Other examples of prior art are U.S. Pat. No. 5,721,783 issued on Feb. 24, 1998 and U.S. Pat. No. 5,751,820 issued on May 12, 1998. In these examples traditional radio topology is abandoned, eliminating most of the electronics with its associated current consumption. By so doing, the carrier frequency can be increased to greater than 5000 MHz where $\lambda/2$ is only 1 inch and a perfectly resonant antenna can be kept away from the skin disguised as a human hair and functioning as a "pull string" to remove the hearing device from inside the ear. Unfortunately, such a receiver does not have the sensitivity offered by traditional radio topology. A transmitter 2 feet away and using the maximum transmit power allowed by radio regulations only results in a 12 dB carrier signal to noise (S/N) ratio at the receiver. A signal emanating from the transmitter antenna may reach the receiving antenna via numerous paths, due to multiple reflections from environmental objects. These reflections result in "multi-path" drop-outs. A carrier S/N ratio of 40 dB is desirable at the receiver in order to minimize these drop-out s. Furthermore, at SHF carrier frequencies, rf path losses due to body blockage (e.g. from the users arms) may be very detrimental. Increasing the carrier S/N ratio requires a closer proximity of the transmit and receive antennas. This is inconvenient because it requires the use of a transmitting collar mounted around the neck or over the shoulders of the user. Such a collar is described in U.S. Pat. No. 6,594,370 B1 issued Jul. 15, 2003. It can be worn under clothing but it is still inconvenient and the received signal can still be degraded when the users head is rotated.

Yet another example of prior art is U.S. Pat. No. 5,774,791 issued Jun. 30, 1998. In this example, traditional radio topology is again abandoned to save current consumption but this time by going to LF carrier frequencies. Again, to comply with radio regulations, the transmit and receive antennas need to be close to each other. Again a neck loop is required, but the signal is not degraded when the user's head is rotated because each antenna is in the near field of the other.

BRIEF SUMMARY OF THE INVENTION

The present invention describes a two piece hearing improvement device with a radio receiver placed around the ear of the user and a radio transmitter placed some distance away (such as in the user's shirt pocket), wherein the carrier frequency of the radio link is set to UHF frequencies so that small antennas with good efficiencies can be used. Additionally, the wires between the radio receiver and the speaker form the antenna of the receiver. The antenna efficiency is not as good as antennas at 5000 MHz because at frequencies below 5000 MHz the length of the antenna still must be less than $\lambda/2$ to be convenient. However, the small loss in efficiency is more than made up by using a sensitive radio receiver. The radio receiver can not use traditional radio topology, however, with its high current consumption. Rather, a new radio topology is disclosed which simultaneously provides high sensitivity and low current consumption.

Crystal oscillators provide signals which are stable in frequency and have low sideband noise. Thus, using a crystal oscillator, a superheterodyne radio receiver with a low intermediate frequency (IF) can be constructed without the need for other circuits to stabilize the oscillator's frequency. A superheterodyne radio receiver is one which receives a wireless radio signal and then converts it to a lower IF signal by beating it against a local oscillator (LO). The IF signal is then processed to recover the desired signal which has been modulated onto the radio signal (the frequency conversion process transfers the modulation onto the IF signal). Also, lower IF frequencies require less current. In the new radio topology, a harmonic overtone crystal oscillator is used for low current consumption. More specifically, a Colpitts overtone crystal oscillator configuration is used such that the crystal oscillates at an overtone of its fundamental frequency (usually third or fifth overtone). In this way, the highest frequency is achieved using the least current. The highest oscillation frequency practically achievable using this method is somewhere around 100 to 150 MHz. In the example of this patent it is 114.49312 MHz. This is still much too low to be useful as the local oscillator (LO) signal in a superheterodyne UHF radio receiver, so the collector of the Colpitts oscillator is tuned to a harmonic of the oscillation frequency. In the example of this patent it is the $8^{th}$ harmonic (915.945 MHz). This frequency is high enough to be used as the LO of a superheterodyne radio receiver in the UHF band of 902 to 928 MHz. However it is much too weak to be a good LO signal and needs to be amplified. High frequency (HF) amplifiers require high operating current and increasing the receiver current consumption is undesirable. Rechargeable batteries supply a voltage range between 3.0V and 4.0V in the case of lithium polymer rechargeable batteries which is the type mostly used in rechargeable hearing aids. However, circuits can be built which operate at lower voltages. It is exactly this fact which is taken advantage of in the present invention to amplify the LO signal without increasing current consumption. Specifically, both the oscillator and an HF amplifier are designed to work at a lower supply voltage. Then their supply terminals are wired in series with the battery so that the same supply current passes through both of them. Meanwhile, the output of the oscillator is wired to the input of the HF amplifier. Thus, the output of the HF amplifier is strong enough to function as the LO signal in a superheterodyne receiver while the supply current (current taken from the battery) of the combined circuit is still only that which is required by a simple oscillator.

Another important element in a sensitive radio receiver is the LNA (low noise amplifier). The LNA amplifies the weak radio frequency (RF) signal received by the antenna, enabling the receiver to receive much weaker RF signals. At higher RF frequencies, an LNA needs higher operating current. This current must be supplied by the battery, so it is desirable to not use an LNA but without an LNA the sensitivity of the radio receiver is degraded to an unacceptable performance level. This seems like an impossible obstacle to overcome. However, in the crystal oscillator and HF amplifier circuit described above, if the RF signal from an antenna is summed with the output of the oscillator, then both signals will be amplified by the HF amplifier. The HF amplifier will then function as an LNA for the RF signal as well as amplifying the oscillator signal and the supply current will still be only that which is required by a simple oscillator. Normally, in a superheterodyne receiver, the RF signal is summed with the LO signal in the mixer, which is a stage which follows the LNA. In the novel topology of the present invention, these two signals are summed in a HF amplifier which precedes the mixer. For this to work, the operating current of the HF amplifier is fixed to be greater than the operating current of the mixer. In this way, any non-linear effect in the HF amplifier does not disturb the operation of the mixer. In a superheterodyne receiver, the mixer is optimized to have a non-linear response, thus creating a signal at a frequency which is the difference between the frequency of the RF signal and the frequency of the LO signal. This difference frequency is the intermediate frequency (IF). The IF signal retains all of the modulation information which is on the RF signal.

In the present invention a very low operating current IF demodulator is selected. This is an integrated circuit which amplifies the IF signal and then demodulates it. The demodulation process removes the audio signal which is modulated onto the IF signal. The audio signal is usually frequency modulated (FM) onto the RF signal and, therefore, onto the IF signal as well. But other forms for modulation may be used, either analog or digital. For example: frequency shift keying (FSK), phase modulation (PM), amplitude modulation (AM) or any other form of modulation well known to persons skilled in the art. The IF demodulator may also include an audio low frequency amplifier and low pass filter. The audio low pass filter filters out noise which is out of the desired audio band. The IF demodulator operating current can be very low because the IF frequency is low. The IF frequency can be low because the sideband noise of a crystal oscillator is very low.

The operating current of a crystal oscillator is usually lower than the start up current of the crystal oscillator. By using a received signal strength output (RSSI) from the IF demodulator to set the operating current in the crystal oscillator, the operating current can be set high enough to start oscillation reliably when there is no signal and then, once signal is received, to set the operating current to a lower value which still continues to maintain oscillation even though it is too low to start the oscillation. For example, if the operating current is at its lower setting and oscillation cannot start, there will be no signal received. The no signal condition will then force the current to the higher setting, thus starting oscillation. Once oscillation starts, if the transmitter is nearby, signal will be received and the current will be reduced back to its lower setting, still maintaining reliable reception but at a much reduced operating current in the crystal oscillator.

In one embodiment of the present invention, the operating currents of the HF amplifier and mixer are designed such that the sum of the operating currents of the HF amplifier, mixer and IF demodulator is equal to the operating current of the oscillator. The supply terminals of the HF amplifier, mixer and IF demodulator are then connected together (in parallel). Then the (parallel-connected) supply terminals of that group of circuits is wired in series with the supply terminals of the oscillator, resulting in a complete radio receiver (antenna input to audio output) which still only draws that current which is required by a simple oscillator. If the IF demodulator has high noise, then an external low noise IF amplifier can be added between the mixer and the IF demodulator input. The IF amplifier can be designed to operate at very low current and the operating currents of the above stages can then be designed such that the sum of the operating currents of the HF amplifier, mixer, IF amplifier and IF demodulator is equal to the operating current of the oscillator. Then the supply terminals of the IF amplifier can be connected in parallel with the supply terminals of the HF amplifier, mixer and IF demodulator. The (parallel-connected) supply terminals of that group of circuits is again wired in series with the supply terminals of the oscillator, again resulting in a complete radio receiver (antenna input to audio output) which still only draws that current which is required by a simple oscillator. If it is not possible to design the operating currents as described above, then one or more of the above supply terminals connected in parallel (supply terminals of the HF amplifier, mixer, IF amplifier and IF demodulator) can be wired in parallel with the battery (not in series with the oscillator). But then the full benefit described by this invention would not be obtained. Some benefit would still be obtained, however, and such wiring still would be in the scope of this invention. It may be advantageous to wire the supply terminals of one or more of the above stages in parallel with the supply terminals of the oscillator and then to wire the supply terminals of the remaining stages in parallel with each other, and then to wire the supply terminals of the two groups in series. It may also be advantageous to design all circuits to operate at a low voltage and wire all supply terminals in parallel, but to still amplify both the antenna signal and the LO signal in the same HF amplifier, thus saving the current consumption of an additional high frequency amplifier. Again, the full benefit described by this invention would not be obtained. But some benefit would still be obtained and such wiring still would be in the scope of this invention.

Although crystal oscillators provide signals which are relatively stable in frequency, they still require temperature compensation when they are used to provide the LO signal in a superheterodyne UHF radio receiver. The IF demodulator also has a frequency sensitive component which requires temperature compensation. In prior art, such compensation is provided by additional circuits in the radio receiver which increase the size of the receiver and increase the current consumption in the receiver. As an example, automatic frequency control (AFC) circuits sense the frequency error as an offset in the average voltage output from the IF demodulator and feed the offset back in a negative sense to the oscillator, thus pulling its frequency such that the average voltage output from the IF demodulator stays fixed at some value. Such a receiver topology could not use an overtone crystal oscillator because the frequency pull range of an overtone crystal oscillator is not great enough. Rather, a different oscillator must be used, even further increasing size and current consumption of the receiver. In the present invention, the operating center frequency of the radio receiver is not temperature compensated, avoiding the AFC circuits. This results in the smallest size receiver and the lowest possible current consumption. Rather, a duplicate circuit is added to the remote transmitter, which is identical to the oscillator and IF demodulator in the radio receiver. The duplicate circuit will have an identical frequency drift over temperature as the circuit in the receiver. Such drift is sensed in the remote transmitter and the transmitter frequency is pulled in lock step with the sensed drift. In such a fashion, the radio receiver always remain exactly on the same frequency as the remote transmitter. The duplicate circuit added to the remote transmitter and additional circuits to pull the transmitter frequency increase the size and current consumption of the remote transmitter, but that is not a concern. The remote transmitter does not have as great a size limitation because it does not need to be placed around the ear of the user.

To insure a reliable link under all possible physical configurations, multiple transmit antennae in different orientations are desirable. Circular polarization antenna techniques may also prove useful depending upon the orientation of the radio receiver relative to the remote transmitter.

Both size and current consumption of the radio receiver can be further reduced by integrating some of its circuitry into an integrated circuit (IC). The size and the current consumption of the remote transmitter can also be further reduced by integrating some of its circuitry into an integrated circuit.

Multiple RF frequency channels can be used to provide a stereo audio wireless link or to allow multiple devices to work in proximity to each other or to provide redundancy as a method of reducing "multi-path" drop-outs. Each independent RF frequency channel will use a different crystal oscillation frequency, the crystal frequencies being spaced far enough apart so that devices do not interfere with each other.

BRIEF DESCRIPTION OF THE DRAWINGS

The foregoing summary, as well as the following detailed description of the preferred embodiments, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Reference will now be made in detail to the present embodiments of the invention, examples of which are illustrated in the accompanying drawings. Wherever possible, the same reference numbers will be used throughout the drawings to refer to the same or like parts.

The present invention is directed to a two-piece wireless hearing improvement system and a method thereof using the example of hearing aids. Hearing aids are only one type of hearing improvement device. Other hearing improvement devices include, but are not limited to, those in this document. It is understood that their use in the description is intended to demonstrate the present subject matter, but not in a limited or exclusive or exhaustive sense. The wireless hearing improvement system includes a receiver piece and a remote transmitter. The receiver piece includes a radio receiver which is fitted around the ear of the user and a speaker which faces the ear canal. The wires interconnecting the two form the receiving antenna of the radio receiver. The separate remote transmitter may be carried in the pocket of the user, may be strategically secured to any part of the user's body, or may be carried in a container within close proximity of the receiver piece.

Figure 1:
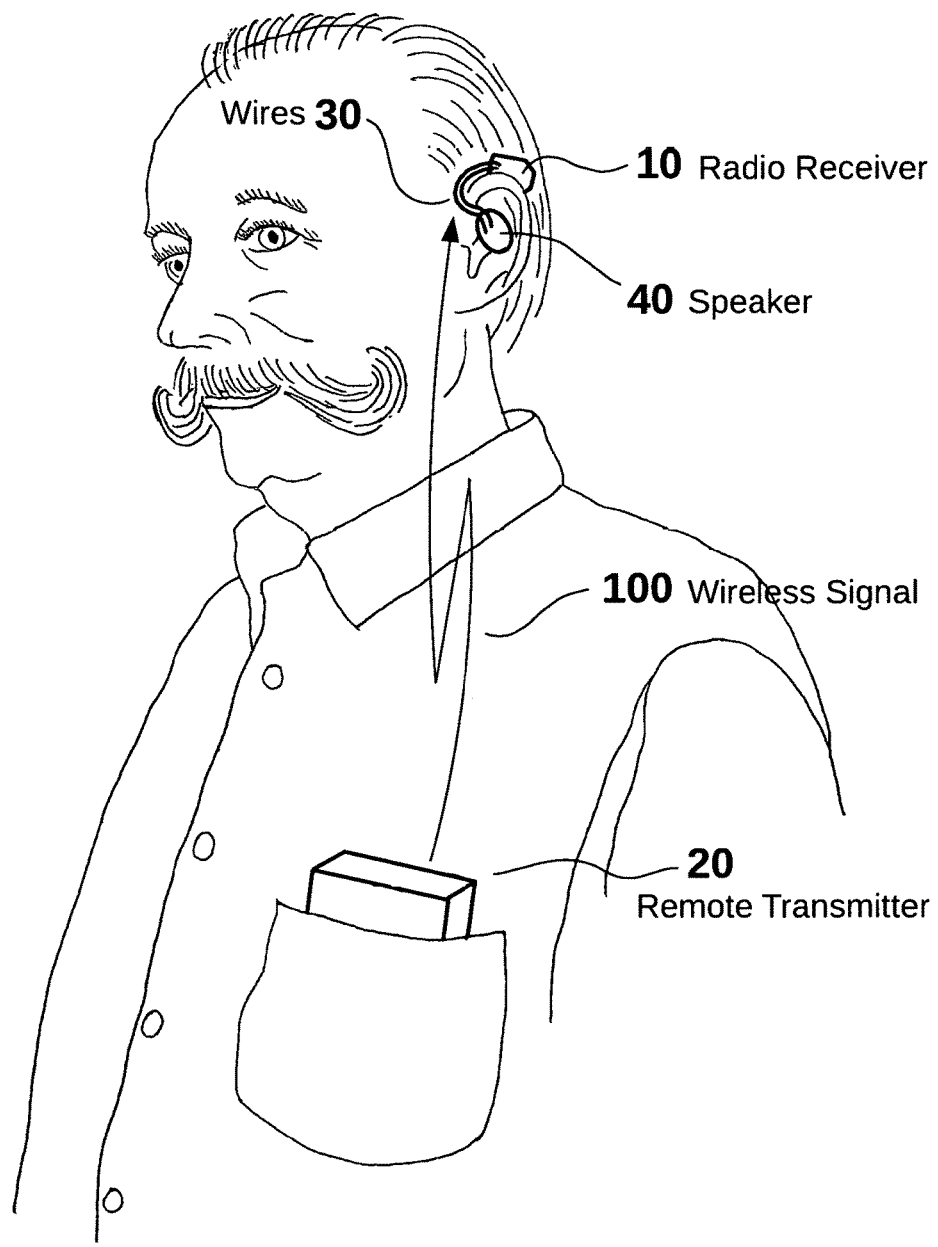
FIG. 1 depicts an embodiment of a two piece wireless hearing improvement system of the present invention worn by a user.

FIG. 1 depicts an embodiment of a two piece wireless hearing improvement system of the present invention including a radio receiver 10, connected to a speaker 40 by wires 30. In FIG. 1, the wires 30 also form the antenna for the radio receiver, receiving a wireless signal 100 from a remote transmitter 20 and having a working distance ranging from about 1 to 2 meters. In an embodiment, the hearing instrument includes an antenna having a working distance ranging to about 10 meters. In an embodiment, the hearing instrument includes an antenna operating at a carrier frequency ranging from about 400 MHz to about 3000 MHz. In an embodiment, the hearing instrument includes an antenna operating at a carrier frequency of 916 MHz. According to various embodiments, the carrier frequencies fall within an appropriate unlicensed band (e.g. ISM (Industrial, Scientific and Medical) frequency band in the United States). For example, some embodiments operate within the 902-928 MHz frequency range for compliance within the United States, and some embodiments operate within the 863-870 MHz frequency range for compliance within the European Union.

Figure 2:
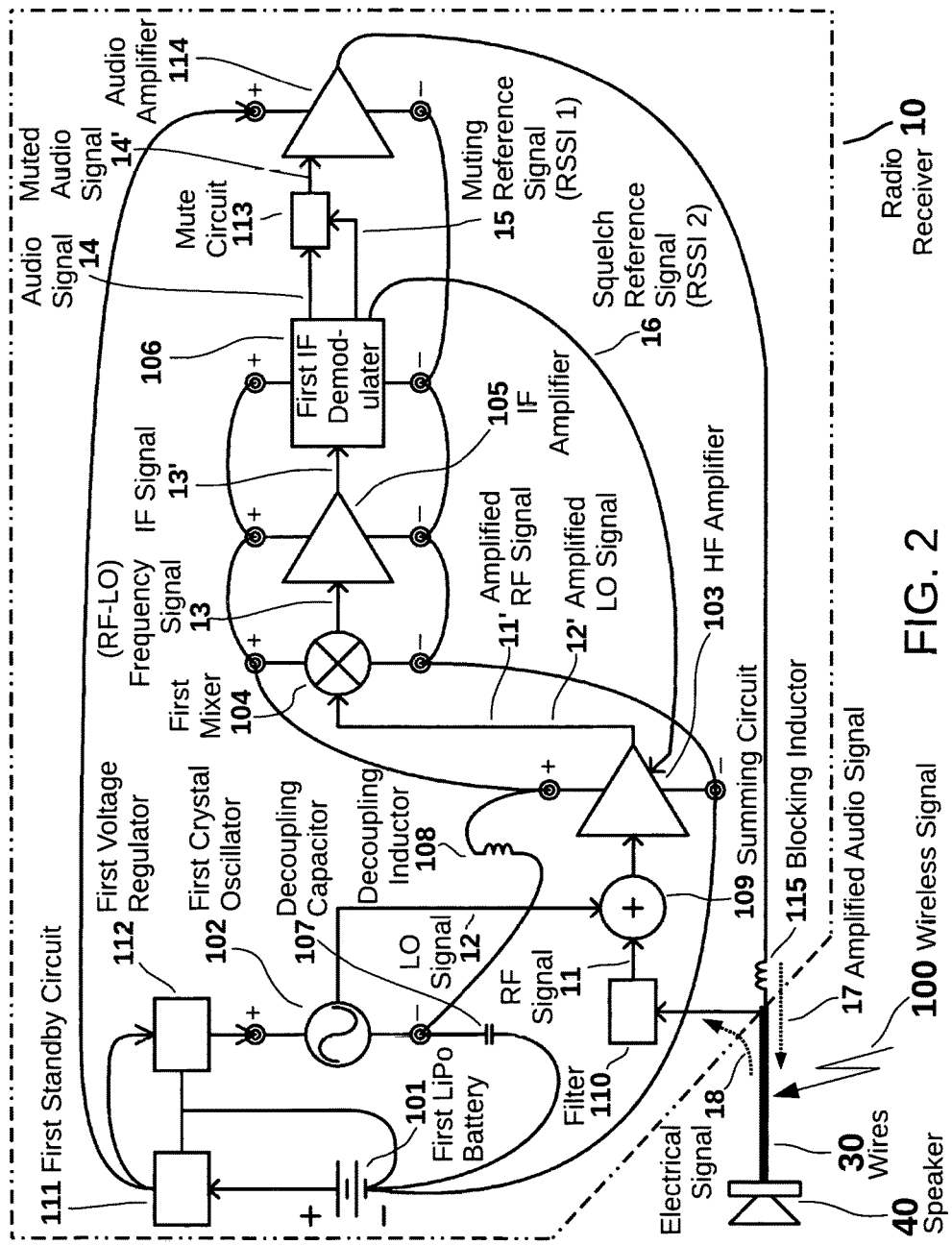
FIG. 2 illustrates a schematic view showing the receiver piece of the two-piece wireless hearing improvement system in accordance with one embodiment of the present invention.

FIG. 2 illustrates a schematic view showing one embodiment of the receiver piece including a radio receiver 10 a speaker 40 and wires 30 interconnecting the two. Referring to FIG. 2, the wireless signal 100 impinging on antenna wires 30 which is desired to be received, induces currents onto the wires, generating an electrical signal 18, which has the same modulation as the wireless signal 100. Typical forms of modulation are frequency modulation, phase modulation or amplitude modulation. The electrical signal 18 is blocked by blocking inductor 115 in radio receiver 10 and thus directed into filter 110 in the radio receiver. The output of filter 110 in the radio receiver is the high radio frequency (RF) signal 11, which is intended to be received. Signals not intended to be received are filtered out by the filter, which is a band pass filter. The radio receiver 10 includes a first lithium polymer battery 101, a first crystal oscillator 102, a high frequency (HF) amplifier 103, a first mixer 104, an IF amplifier 105, a first IF demodulator 106, a decoupling capacitor 107, a decoupling inductor 108, a summing circuit 109, a filter 110, a first standby circuit 111, a first voltage regulator 112, a mute circuit 113, an audio amplifier 114, and a blocking inductor 115. The first lithium polymer battery 101 provides electrical power to the receiver piece. The first crystal oscillator 102 comprises an overtone crystal and produces an oscillation at 114.49312 MHz, from which the eight harmonic is extracted, giving a local oscillator (LO) output signal 12 at 915.945 MHz. The LO signal 12 given by the crystal oscillator 102 and RF signal 11 given by the filter 110 are summed in the summing circuit 109 and the sum is amplified by the HF amplifier 103 producing signals 11' and 12' which are sent to mixer 104. In mixer 104, the product of the two signals, the amplified RF signal 11' and the amplified LO signal 12', is formed. This signal generated in the mixer has a frequency spectrum in the form of RF frequency+/−LO frequency. The mixer also includes an intermediate frequency filter which selects the mixer product, the RF frequency minus the LO frequency. This signal 13 is transmitted to an IF amplifier 105 which amplifies the signal. This amplified mixer product is designated as the intermediate frequency signal 13'.

The radio receiver according to the invention is constructed as a superheterodyne receiver with a simple conversion of the signal received to the intermediate frequency signal with a low selected intermediate frequency. Owing to the low intermediate frequency, the frequencies of the high frequency signal to be received and of the high frequency signal with the image frequency are very close together. Reception of a high frequency signal with the image frequency can be prevented, on the other hand, with a selectively designed high frequency amplifier or filter, and, on the other hand, with a selective antenna. In the present design, a complete rejection of the high frequency signal with the image frequency has been dispensed with because by choosing the low intermediate frequency and by means of only a weak selectivity of the filter 110, the main emphasis of the circuit design has been placed on minimal current consumption and the smallest possible volume of the receiver to be realized. To compensate the loss through selectivity, the selected spacing of effective channels to be received is large.

The intermediate frequency signal 13' is transmitted to the first IF demodulator 106 in which a low frequency audio signal 14 is obtained from the intermediate frequency signal. The IF demodulator 106 likewise delivers a reference signal 15 for a muting or squelch circuit and a reference signal 16 for a circuit which sets the operating current of HF amplifier 103 (and therefore the operating current of the crystal oscillator 102 by virtue of the series power supply connection) in the form of received signal strength indications (RSSI 1 and RSSI 2). In other embodiments digital signals may be obtained from the IF demodulator (representing the audio as well as RSSI 1 and RSSI 2). The RSSI 1 signal 15 directs the Mute circuit 113 to only output audio signal 14' to the audio amplifier when the wireless signal 100 is strong enough to be received properly. The RSSI 2 signal 16 alters the current consumption in the HF amplifier 103 (and therefore the crystal oscillator 102) depending on the strength of the received wireless signal 100.

Referring to FIG. 2, first lithium polymer battery 101 supplies power to radio receiver 10. First standby circuit 111 constantly monitors the battery voltage of first battery 101. In the case where the voltage monitored is low, the first standby circuit provides for the switching off of the radio receiver electrical circuit, except for an extremely small residual current consumed by the first standby circuit itself. If the voltage monitored returns or increases, the first standby circuit switches the radio receiver to normal operation. First voltage regulator 112 takes in the voltage output from first standby circuit 111 (which slowly decays as the battery discharges) and outputs a fixed regulated voltage (set to be just under the minimum acceptable operating voltage of the battery) to the rest of the circuit excluding audio amplifier 114. Audio amplifier 114 is powered directly from the output of the standby circuit because it needs the full voltage of the battery to faithfully amplify the peaks in the audio signal and also because the peak currents drawn by audio amplifier 114 need to be isolated from the power going to the sensitive radio circuits. The stages consuming current from the output of the voltage regulator are: the crystal oscillator 102, the HF amplifier 103, the mixer 104, the IF amplifier 105, and the IF demodulator 106. Each of these stages has a positive and a negative power terminal. Normally, all the negative power terminals would be connected to the negative terminal of the battery supplying power. Likewise, normally, all the positive power terminals of the stages would be connected to the output of the voltage regulator. However, this is not the most efficient way of powering the stages. Since, in the case of a lithium polymer rechargeable battery, the voltage of the battery supplying power never drops below 3.0V, then the voltage regulator can be set to 3.0V and, in accordance with the present invention, the stages receiving power from the voltage regulator can be designed to operate at lower voltages such that the power terminals of some stages can be connected in series with the power terminals of other stages. In this way, the overall current consumption can be reduced. Of all these stages, the crystal oscillator requires the most current. Thus, in the preferred embodiment shown, all the stages receiving power from the output of the voltage regulator were designed to operate at such a specific voltage and using such specific current that their power terminals can be connected as shown in FIG. 2. That is, the power terminals of the HF amplifier 103, the mixer 104, the IF amplifier 105, and the IF demodulator 106 are connected in parallel such that their negative terminals (connected together) connect to the battery negative terminal and their positive terminals (connected together) connect to the negative terminal of the crystal oscillator 102 through a decoupling inductor 108. The inductor 108 may be omitted in some embodiments, depending on circuit layout. To insure that the crystal oscillator 102 negative power terminal has a low impedance return path to the negative terminal of the battery, a decoupling capacitor 107 is connected between the negative power terminal of the crystal oscillator and the negative power terminal of the battery. In another embodiment (not shown in FIG. 2) there can also be a decoupling capacitor connected between the other terminal of inductor 108 and the output of the voltage regulator. In the preferred embodiment, audio frequency amplifier 114 is coupled to audio signal 14' (which is output by muting circuit 113) and provides selective low frequency amplification and outputs an amplified audio signal 17 to blocking inductor 115. Blocking inductor 115 is sized to only block high frequency signal and thus passes audio signal 17 with substantially no attenuation to speaker 40 via wires 30.

In another embodiment there may also be an audio low pass or equalization filter coupled to audio signal 14, the output of the filter connecting to the input of mute circuit 113. In yet another embodiment there may also be an audio low pass or equalization filter coupled to audio signal 14', the output of the filter connecting to the input of audio amplifier 114.

Figure 3:
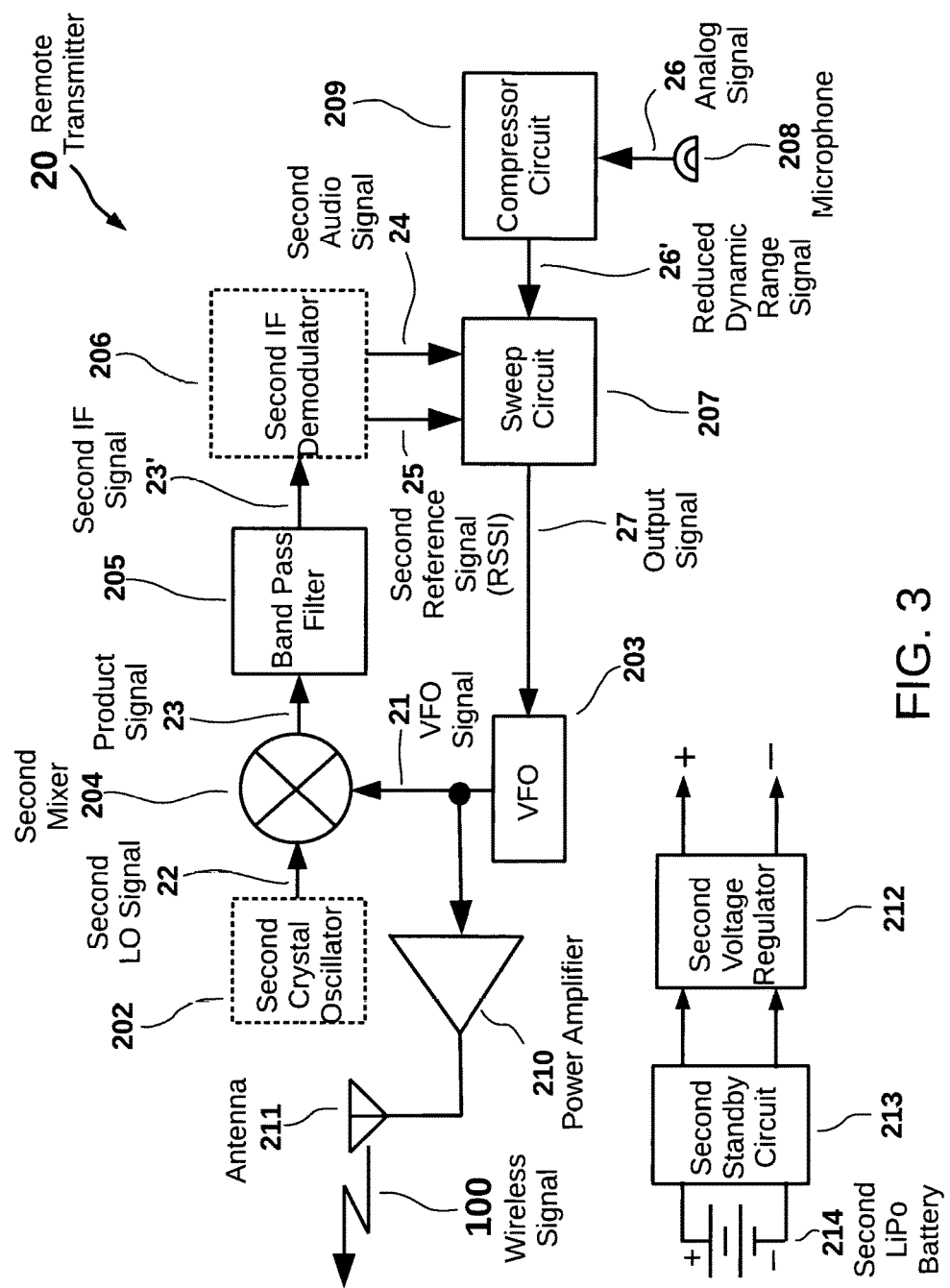
FIG. 3 illustrates a schematic view showing the remote transmitter of the two-piece wireless hearing improvement system in accordance with one embodiment of the present invention.

FIG. 3 illustrates a schematic view showing one embodiment of the remote transmitter 20. Referring to FIG. 3, the remote transmitter 20 is intended for transmitting a wireless signal 100 to antenna 30 in the receiver piece. The remote transmitter 20 includes a second crystal oscillator 202, a variable frequency oscillator (VFO) 203, a second mixer 204, a band pass filter (BPF) 205, a second IF demodulator 206, a sweep circuit 207, a microphone 208, a compressor circuit 209, a high frequency power amplifier 210, an antenna 211, a second voltage regulator 212, a second standby circuit 213, and a second lithium polymer battery 214. In the second mixer stage 204, the product of the two input signals, the VFO signal 21 given by the VFO oscillator 203 and the second LO signal 22 given by the second crystal oscillator 202, is formed. This product signal 23 generated in the second mixer stage has a frequency spectrum in the form of VFO frequency+/−second LO frequency. This product signal 23 is transmitted to a band pass filter 205 which selects the mixer product, the VFO frequency minus the second LO frequency, and sharply filters out all signals outside the bandwidth of the second IF demodulator 206. The output of the band pass filter is designated as the second intermediate frequency signal 23'. The second intermediate frequency signal 23' is transmitted to the second IF demodulator 206 in which a second low frequency audio signal 24 is obtained from the second intermediate frequency signal. The second IF demodulator 206 likewise delivers a second reference signal 25 in the form of received signal strength indication (RSSI). The microphone 208 receives ambient sounds and outputs an analog signal 26 representing those sounds as an alternating current (AC) component. The analog signal 26 is transmitted to the compressor circuit 209. The compressor circuit amplifies the analog signal 26 output by microphone 208 while reducing its dynamic range. This reduced dynamic range signal (which still only has an AC component) is output by the compressor circuit 209 and is designated as signal 26'. The signals 24, 25 and 26' are transmitted to the sweep circuit 207. When the signal 25 is above some predetermined threshold, the sweep circuit 207 low pass filters signal 24, removing any AC components and sums it with signal 26', which has no DC component, giving the sum as an output signal 27. Signal 27 is used to frequency modulate VFO 203 with the AC component of signal 26' and to keep the VFO on the center frequency, as determined by second crystal oscillator 202 and second IF demodulator 206, with the DC component of signal 24. When the signal 25 is below the predetermined threshold, the sweep circuit 207 slowly sweeps output signal 27 from one extreme to the other, in this way forcing the frequency of the VFO output signal 21 to sweep from one extreme to the other. When the frequency of signal 21 is just right so that signal 23' falls within the bandwidth of the second IF demodulator 206, signal 25 will rise above the predetermined threshold and stop the sweeping process. Finally, power amplifier 210 coupled to the output of VFO 203 amplifies the VFO output signal 21 and transmits the amplified signal to antenna 211. Antenna 211 radiates the signal as high frequency wireless signal 100. The second crystal oscillator 202 in the remote transmitter is a duplicate of the first crystal oscillator 102 including decoupling capacitor 107 in the radio receiver and the second IF demodulator 206 in the remote transmitter is a duplicate of the first IF demodulator 106 in the radio receiver. Because the two circuits in the remote transmitter are duplicates of like circuits in the radio receiver and because all four circuits are in close proximity to each other, the remote transmitter circuits will have a temperature drift substantially identical to the temperature drift of the radio receiver circuits. Because none of the other circuits in the radio receiver and remote transmitter have significant effect on operating frequency and because the transmit frequency of the remote transmitter is frequency locked or phase locked to the circuits 202 and 206, the temperature drift of the transmit frequency of the remote transmitter is substantially identical to the temperature drift of the receive frequency of the radio receiver. Second lithium polymer battery 214 supplies power to remote transmitter 20. Second standby circuit 213 constantly monitors the battery voltage of second battery 214. In the case where the voltage monitored is low, the second standby circuit provides for the switching off of the remote transmitter electrical circuit, except for an extremely small residual current consumed by the second standby circuit itself. If the voltage monitored returns or increases, the second standby circuit switches the remote transmitter to normal operation. Second voltage regulator 212 takes in the voltage output from second standby circuit 213 (which slowly decays as the battery discharges) and outputs a fixed regulated voltage, which is set to be the same voltage as output by the first regulator 112 in the radio receiver circuit 10, to the rest of the circuit. This helps to insure that the temperature drift of the transmit frequency of the remote transmitter is substantially identical to the temperature drift of the receive frequency of the radio receiver.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A wireless communication system, comprising:
   a first piece including:
      an electrically operating antenna responsive to a high frequency radio signal and providing an antenna electrical signal,
      a first power supply having a positive terminal and a negative terminal and configured to provide power for the first piece,
      a first oscillator having a positive terminal and a negative terminal and configured to receive power on the positive and negative terminals and generating a high frequency oscillator signal,
      an amplifier having a positive terminal and a negative terminal and configured to receive power on the positive and negative terminals for amplifying the antenna electrical signal or the high frequency oscillator signal, producing an amplified antenna electrical signal or amplified high frequency oscillator signal,
      a mixer having a positive terminal and a negative terminal and configured to receive power on the positive and negative terminals and which mixes the antenna electrical signal or amplified antenna electrical signal with the high frequency oscillator signal or amplified high frequency oscillator signal and generating an intermediate frequency signal, and
      a first demodulator coupled to said mixer and having a positive terminal and a negative terminal and configured to receive power on the positive and negative terminals and generating a low frequency output signal from the intermediate frequency signal,
      wherein the positive terminal of at least one of said first oscillator and said amplifier and said mixer and said first demodulator is wired to the negative terminal of at least one of said first oscillator and said amplifier and said mixer and said first demodulator; and
   a second piece, configured to transmit the high frequency radio signal to said first piece and including:
      a second power supply configured to provide power for the second piece,
      an input circuit configured to receive a low frequency input signal, and
      a transmitter coupled to said input circuit and configured to transmit the high frequency radio signal.

2. The system as recited in claim 1, wherein said amplifier is configured to amplify a sum of said antenna electrical signal and said high frequency oscillator signal and providing an amplified sum signal, and wherein said mixer is configured to mix said amplified sum signal, generating an intermediate frequency signal.

3. The system as recited in claim 1, wherein said received power of said first oscillator is responsive to a strength of said antenna electrical signal.

4. The system as recited in claim 1, the first piece further including:

a decoupling inductor,
wherein the decoupling inductor is interposed in series with a connection of said positive terminal to said negative terminal.

5. The system as recited in claim 1, the first piece further including:
a decoupling capacitor connected between said connection negative terminal and the negative terminal of said first power supply.

6. The system as recited in claim 1, the first piece further including:
an intermediate frequency amplifier coupled to said mixer for amplifying the intermediate frequency signal and providing an amplified intermediate frequency signal,
wherein said first demodulator is coupled to the intermediate frequency amplifier and generating a low frequency output signal from the amplified intermediate frequency signal.

7. The system as recited in claim 1, wherein the first piece further includes:
a low frequency amplifier coupled to said first demodulator for amplifying the low frequency output signal and producing an amplified low frequency signal, and
wires coupled to the low frequency amplifier for conducting the amplified low frequency signal,
wherein said wires are a part of said electrically operating antenna.

8. The system as recited in claim 1, wherein said electrically operating antenna further incorporates a filter for excluding undesired signals.

9. The system as recited in claim 1, wherein said mixer does not have positive and negative terminals for receiving power.

10. The system as recited in claim 1, wherein said first demodulator does not have positive and negative terminals for receiving power.

11. The system as recited in claim 1, wherein the second piece further includes:
a compressor circuit coupled to said input circuit and outputting a compressed signal with a range of intensities substantially reduced from the range of intensities of the low frequency input signal,
wherein said transmitter is coupled to an output of said compressor circuit.

12. The system as recited in claim 1, the second piece further including:
a second oscillator substantially identical to said first oscillator, and
a second demodulator substantially identical to said first demodulator,
wherein a center frequency of said transmitter is adjusted according to a frequency drift in said second oscillator and said second demodulator.

13. A wireless communication receiver, including:
an electrically operating antenna responsive to a high frequency radio signal and providing an antenna electrical signal,
an oscillator configured to generate a high frequency oscillator signal in the form of a sine wave with no modulation,
an amplifier configured to amplify a sum of said antenna electrical signal and said high frequency oscillator signal and providing an amplified sum signal, and
a mixer having a single input port connected to said amplified sum signal, and configured to mix said amplified sum signal and generating an intermediate frequency signal,
wherein an operating current of said amplifier is substantially higher than an operating current of said mixer.

14. A wireless communication system, comprising:
a first piece including:
an electrically operating antenna responsive to a high frequency radio signal and providing an antenna electrical signal,
a first oscillator configured to generate a high frequency oscillator signal,
a mixer which mixes said antenna electrical signal and said high frequency oscillator signal and generating an intermediate frequency signal, and
a first demodulator coupled to said mixer and responsive to a center frequency of the intermediate frequency signal; and
a second piece, configured to transmit the high frequency radio signal to said first piece, including:
a second oscillator substantially identical to said first oscillator, and
a second demodulator substantially identical to said first demodulator,
wherein a center frequency of said high frequency radio signal is adjusted according to a frequency drift in said second oscillator and said second demodulator.

* * * * *